United States Patent
Hendricks et al.

(10) Patent No.: US 12,416,350 B1
(45) Date of Patent: Sep. 16, 2025

(54) TORQUE CONVERTER WITH PULLING BIAS SPRING

(71) Applicant: Schaeffler Technologies AG & Co. KG, Herzogenaurach (DE)

(72) Inventors: Mark Hendricks, Akron, OH (US); Jeremy Jewell, Wooster, OH (US); David Avins, Burbank, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 18/602,460

(22) Filed: Mar. 12, 2024

(51) Int. Cl.
*F16H 45/02* (2006.01)
*F16H 41/24* (2006.01)

(52) U.S. Cl.
CPC ............. *F16H 45/02* (2013.01); *F16H 41/24* (2013.01); *F16H 2045/0236* (2013.01)

(58) Field of Classification Search
CPC ... F16H 45/00–2045/0294; F16H 41/24; F16F 15/00–145
See application file for complete search history.

(56) References Cited

U.S. PATENT DOCUMENTS

| | | | |
|---|---|---|---|
| 4,986,398 A | 1/1991 | Olsen | |
| 5,771,999 A * | 6/1998 | Kleifges | F16F 15/1292 192/213.12 |
| 7,225,908 B2 | 6/2007 | Back et al. | |
| 8,607,556 B2 * | 12/2013 | Graf | F16D 3/66 29/524.1 |
| 9,810,304 B2 | 11/2017 | Lindemann et al. | |
| 9,816,596 B1 | 11/2017 | Nelson et al. | |
| 10,267,398 B2 | 4/2019 | Ramsey et al. | |
| 10,465,782 B2 | 11/2019 | Vanni et al. | |
| 2006/0266606 A1* | 11/2006 | Back | F16H 45/02 192/3.3 |
| 2007/0074943 A1 | 4/2007 | Hemphill et al. | |
| 2009/0078522 A1 | 3/2009 | Jung et al. | |
| 2012/0160627 A1* | 6/2012 | Kneidel | F16H 45/02 192/3.28 |
| 2017/0211673 A1* | 7/2017 | Norwich | F16H 45/02 |
| 2023/0151873 A1* | 5/2023 | Hoff | F16F 15/12353 192/212 |

* cited by examiner

*Primary Examiner* — Ernesto A Suarez
*Assistant Examiner* — Lillian T Nguyen

(57) ABSTRACT

A torque converter includes: a front cover arranged to receive torque; an impeller having an impeller shell non-rotatably connected to the front cover; a turbine in fluid communication with the impeller and including a turbine shell; and a damper assembly disposed axially between the front cover and the turbine shell. The damper assembly includes a first cover plate non-rotatably connected to the turbine shell. The damper assembly further includes a second cover plate non-rotatably connected to the first cover plate and disposed axially between the front cover and the first cover plate. The damper assembly further includes an intermediate flange disposed axially between the first cover plate and the second cover plate. The damper assembly further includes a bias spring engaged with the intermediate flange and the second cover plate. The bias spring is configured to pull the second cover plate into contact with the intermediate flange.

20 Claims, 6 Drawing Sheets

TORQUE CONVERTER WITH PULLING BIAS SPRING

TECHNICAL FIELD

The present disclosure generally relates to torque converters. More specifically, embodiments of the disclosure relate to a diaphragm spring for a torque converter.

BACKGROUND

Many vehicles include a launch device between the engine and the transmission. A torque converter is a type of launch device commonly used in vehicles having an automatic transmission. A typical torque converter includes an impeller fixed to the crankshaft of the engine and a turbine fixed to a turbine shaft, which is the input to the transmission. To improve fuel economy, many torque converters include a bypass or lockup clutch that mechanically couples the turbine to a case of the torque converter to bypass the fluid coupling.

In some embodiments, a damper assembly for a torque converter may include a bias spring used to push other damper components into contact with each other to create friction and thereby improve NVH (i.e., "noise," "vibration," and "harshness") performance of the damper assembly. However, such a bias spring can increase a size of the damper assembly due to a stack path required to utilize the bias spring to create the contact between the intermediate flange and the one cover plate. Due to limited spacing within a torque converter envelope, it is desirable to have alternative designs and configurations to fit all the necessary components within the torque converter while still meeting durability and performance requirements.

SUMMARY

Embodiments of the present disclosure provide a torque converter having a front cover arranged to receive torque. The torque converter further includes an impeller having an impeller shell non-rotatably connected to the front cover. The torque converter further includes a turbine in fluid communication with the impeller and including a turbine shell. The torque converter further includes a damper assembly disposed axially between the front cover and the turbine shell. The damper assembly includes a first cover plate non-rotatably connected to the turbine shell. The damper assembly further includes a second cover plate non-rotatably connected to the first cover plate and disposed axially between the front cover and the first cover plate. The damper assembly further includes an intermediate flange disposed axially between the first cover plate and the second cover plate. The damper assembly further includes a bias spring engaged with the intermediate flange and the second cover plate. The bias spring is configured to pull the second cover plate into contact with the intermediate flange.

In embodiments, the damper assembly may further include a drive flange disposed axially between the first and second cover plates. The drive flange may be arranged to non-rotatably connect to a transmission input shaft. The intermediate flange may be disposed axially between the drive flange and the second cover plate. The intermediate flange may be radially spaced from the transmission input shaft. In embodiments, the torque converter may further include a further bias spring engaged with the turbine shell and the first cover plate. The further bias spring may be configured to push the first cover plate into contact with the drive flange. The further bias spring may be disposed radially inside of the intermediate flange.

In embodiments, the damper assembly may further include an arc spring supported by the first cover plate and the second cover plate. The bias spring may be disposed radially inside of the arc spring. The intermediate flange and the second cover plate may be configured to contact each other radially outside of the arc spring.

In embodiments, the intermediate flange may include an axially extending portion disposed radially inside of the second cover plate. The bias spring may be engaged with the axially extending portion. The axially extending portion may include a slot extending, at least partially, radially therethrough. The bias spring may be disposed, at least partially, in the slot. The axially extending portion may include a flange extending radially outwardly from the axially extending portion. The bias spring may be in contact with the flange. The axially extending portion may include two radial stops circumferentially spaced from each other and configured to radially constrain the bias spring. The flange may be disposed circumferentially between the two radial stops.

In embodiments, the bias spring may include a body in contact with the second cover plate and a tab extending radially inwardly from the body. The body may be disposed axially between the second cover plate and the front cover. The intermediate flange may include a retaining feature disposed axially between the body and the first cover plate. The retaining feature may be configured to deflect the tab relative to the body towards the first cover plate.

Embodiments of the present disclosure further provide a damper assembly for a torque converter. The damper assembly includes a first cover plate arranged to receive torque. The damper assembly further includes a second cover plate non-rotatably connected to the first cover plate and axially spaced from the first cover plate. The damper assembly further includes an intermediate flange disposed axially between the first cover plate and the second cover plate. The damper assembly further includes a bias spring engaged with the intermediate flange and the second cover plate. The bias spring is configured to pull the second cover plate into contact with the intermediate flange.

In embodiments, the damper assembly may further include an arc spring supported by the first cover plate and the second cover plate. The bias spring may be disposed radially inside of the arc spring. The intermediate flange and the second cover plate may be configured to contact each other radially outside of the arc spring.

In embodiments, the bias spring may include a body in contact with the second cover plate and a tab extending radially inwardly from the body. The second cover plate may be disposed, at least partially, between the body and the first cover plate. The intermediate flange may include a retaining feature disposed axially between the body and the first cover plate. The retaining feature may be configured to deflect the tab relative to the body towards the first cover plate.

In embodiments, the intermediate flange may include an axially extending portion disposed radially inside of the second cover plate. The bias spring may be engaged with the axially extending portion.

In embodiments, the axially extending portion may include a retaining feature configured to engage the bias spring. The retaining feature may be one of a slot or a radially extending flange.

Embodiments presented herein provide the advantageous benefit of providing a bias spring configured to pull damper assembly components into contact with each other, which reduces a stack path for creating friction between the components. Further, embodiments disclosed herein offer design advantages by reducing a variation in install height of the pulling bias spring, which can result in more consistent hysteresis, loads, and stresses for the pulling bias spring while satisfying packaging constraints of the torque converter.

DETAILED DESCRIPTION

Embodiments of the present disclosure are described herein. It should be appreciated that like drawing numbers appearing in different drawing views identify identical, or functionally similar, structural elements. Also, it is to be understood that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

The terminology used herein is for the purpose of describing particular aspects only, and is not intended to limit the scope of the present disclosure. Unless defined otherwise, all technical and scientific terms used herein have the same meaning as commonly understood to one of ordinary skill in the art to which this disclosure belongs. Although any methods, devices or materials similar or equivalent to those described herein can be used in the practice or testing of the disclosure, the following example methods, devices, and materials are now described.

Figure 1:
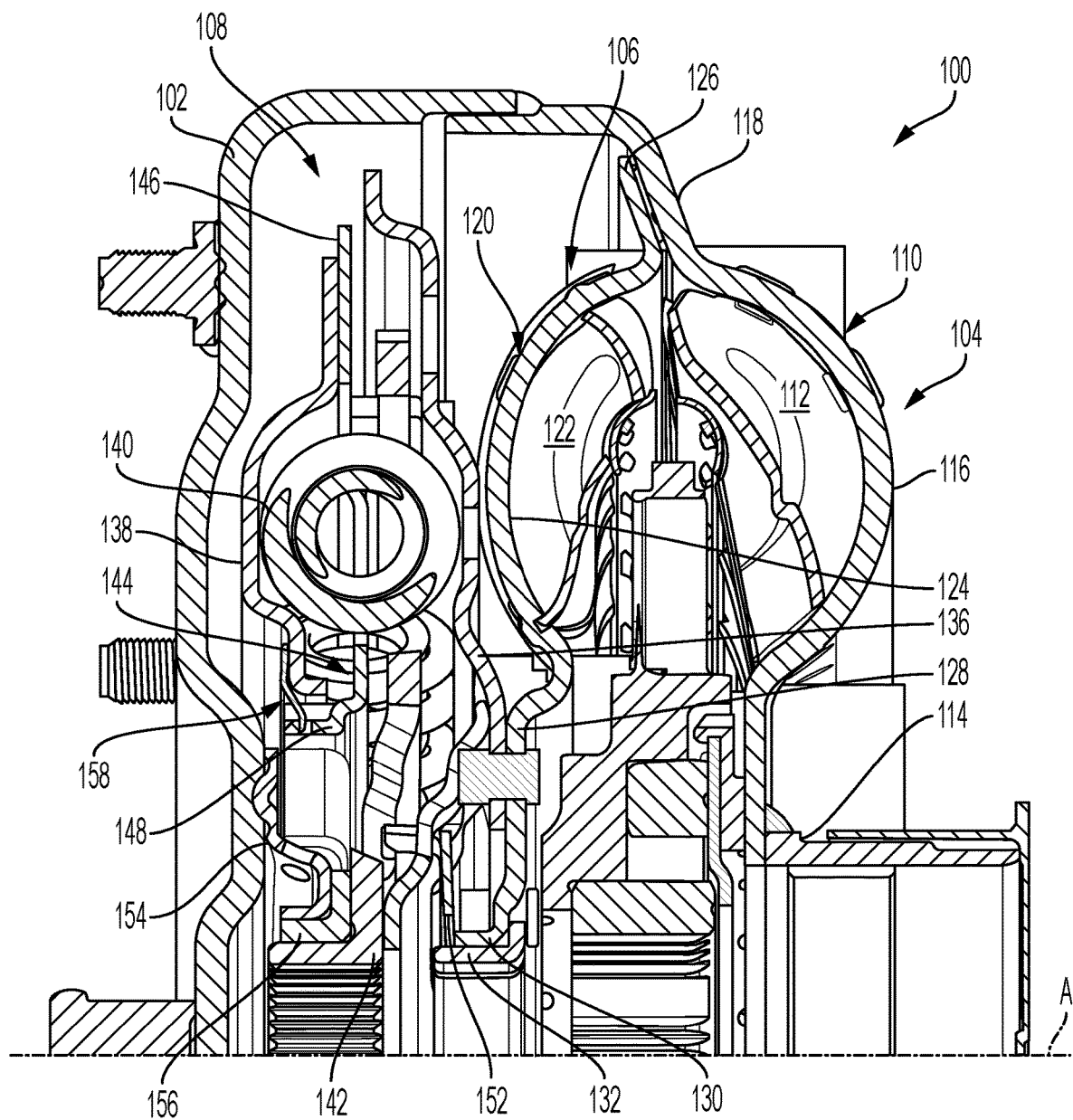
FIG. 1 illustrates a cross-sectional side view of a torque converter including one embodiment of an intermediate flange according to the present disclosure.
Figure 2:
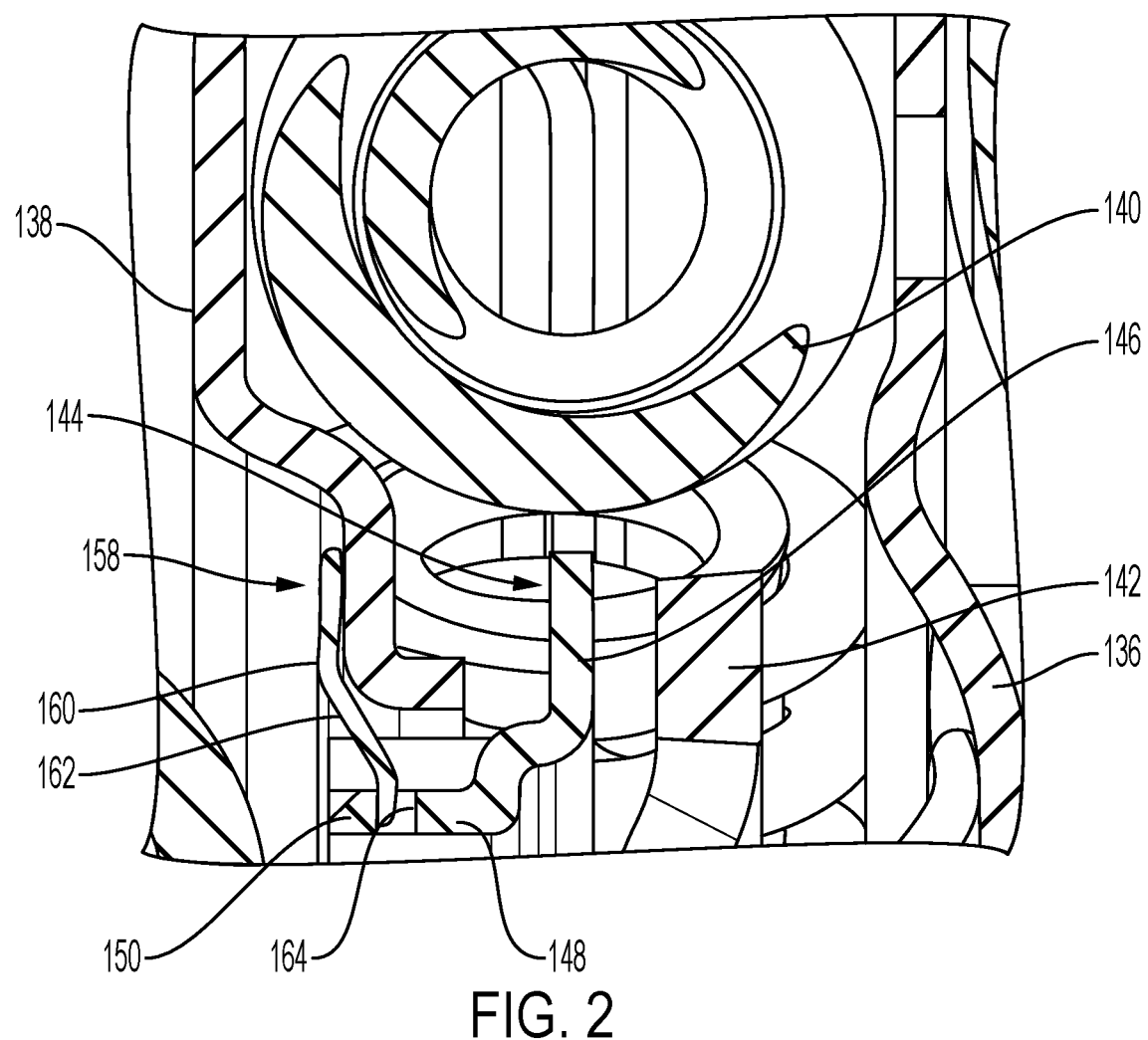
FIG. 2 illustrates an enlarged view of an area of the torque converter shown in FIG. 1.
Figure 3:
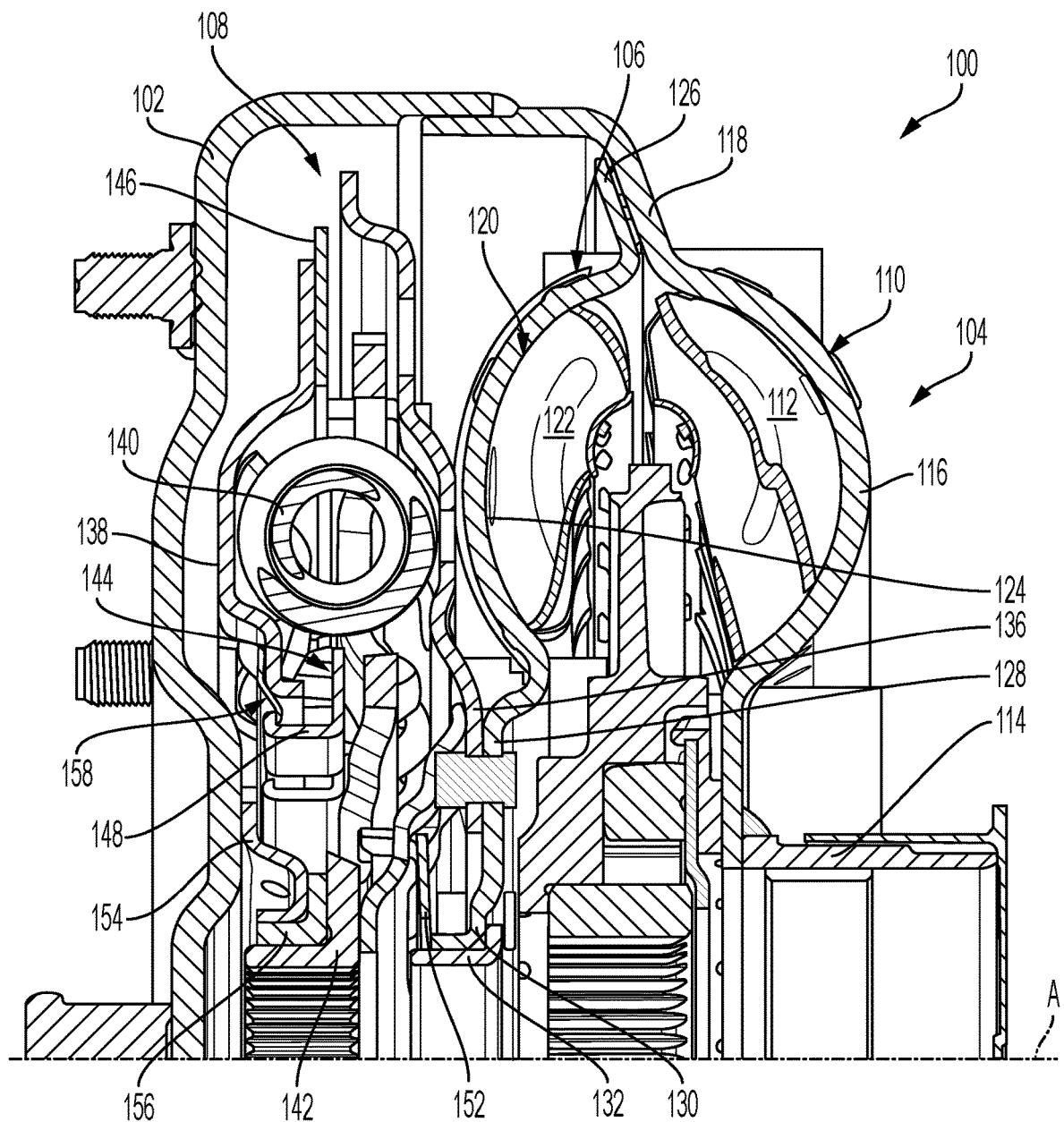
FIG. 3 a cross-sectional side view of a torque converter including an alternative embodiment of the intermediate flange according to the present disclosure.
Figure 4:
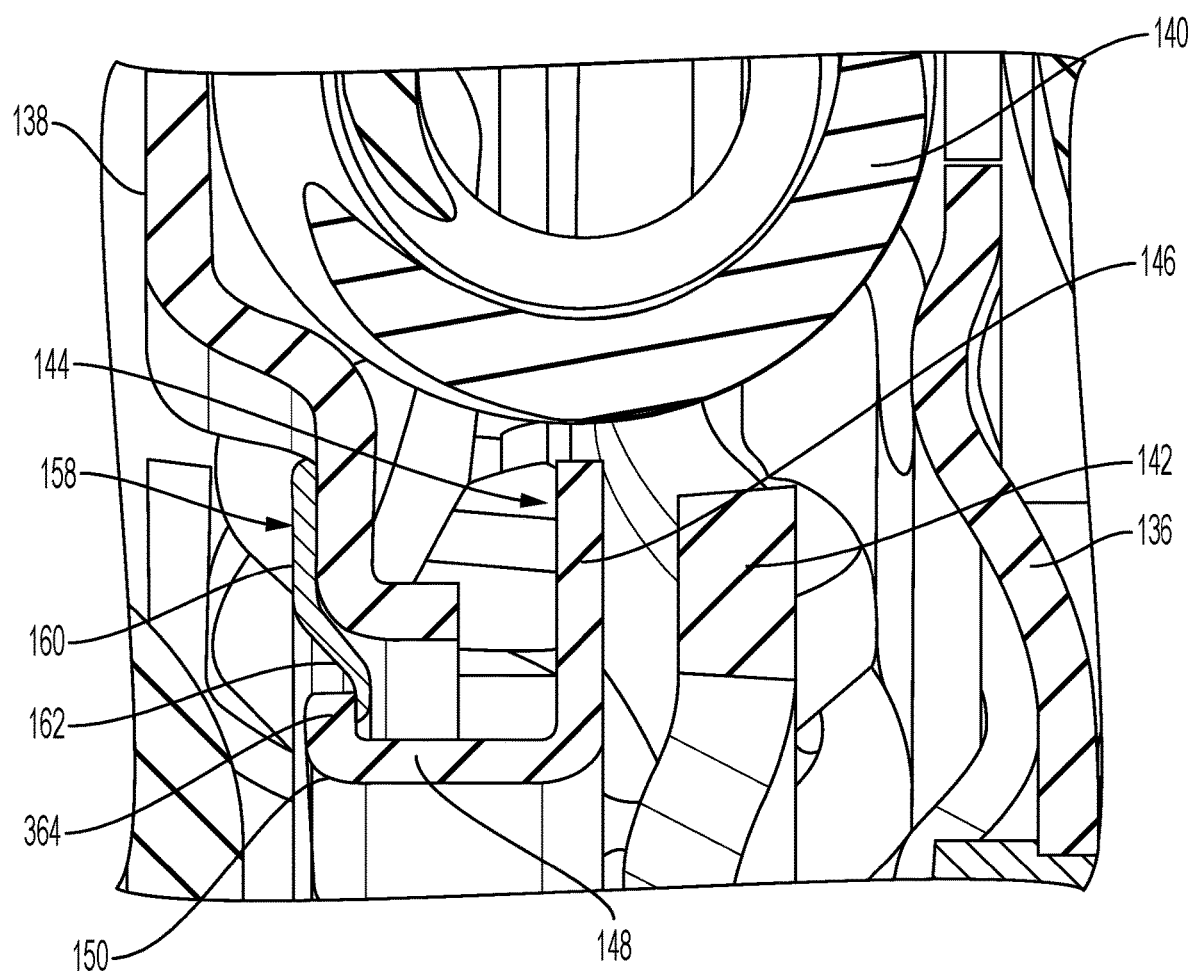
FIG. 4 illustrates an enlarged view of the area of the torque converter shown in FIG. 3.

Referring to FIGS. 1-2, a portion of a torque converter 100 is illustrated according to one embodiment of the present disclosure. At least some portions of the torque converter 100 are rotatable about a central axis A. While only a portion of the torque converter 100 above the central axis A is shown in FIG. 1, it should be understood that the torque converter 100 can appear substantially similar below the central axis A with many components extending about the central axis A. Words such as "axial," "radial," "circumferential," "outward," etc. as used herein are intended to be with respect to the central axis A.

The torque converter 100 includes: a front cover 102 arranged to receive torque; an impeller assembly 104; a turbine assembly 106; and a damper assembly 108. The impeller assembly 104 includes: an impeller shell 110 non-rotatably connected to the front cover 102; at least one impeller blade 112 attached to an inner surface of the impeller shell 110; and an impeller hub 114 fixed to a radially inner end of the impeller shell 110. The impeller shell 110 includes a blade supporting portion 116 for supporting the impeller blade(s) 112. Radially outside of blade supporting portion 116, a radially extending wall 118, which forms an impeller clutch, radially protrudes outwardly from an outer circumference of rounded blade supporting portion 116. Accordingly, the impeller clutch and impeller shell 110 are formed as a single piece. By "non-rotatably connected" components, we mean that: the components are connected so that whenever one of the components rotate, all the components rotate; and relative rotation between the components is not possible. Radial and/or axial movement of non-rotatably connected components with respect to each other is possible, but not required.

The turbine assembly 106 is configured to define a piston that is axially moveable toward and away from the impeller assembly 104 to engage and disengage the impeller clutch so as to form a lock-up clutch. The turbine assembly 106 includes a turbine shell 120 and at least one turbine blade 122 attached to the turbine shell 120. The turbine shell 120 includes a blade supporting portion 124 for supporting the turbine blade(s) 122. Radially outside of the blade supporting portion 124, the turbine shell 120 includes an outer radial extension 126, which forms the piston and radially protrudes outwardly from an outer circumference of the blade supporting portion 124. Accordingly, the piston and the turbine shell 120 are formed as a single piece. Radially inside of the blade supporting portion 124, the turbine shell 120 includes an inner radial extension 128 that, at an inner radial end thereof, joins an axially extending inner circumferential section 130, whose inner circumferential surface contacts an outer circumferential surface of a hub 132.

A friction material (not numbered) is bonded onto a surface of outer radial extension 126 for engaging radially extending wall 118. In some embodiments, instead of or in addition to being bonded to the outer radial extension 126, friction material may be bonded to radially extending wall 118.

The damper assembly 108, which together with the turbine assembly 106 form a drive assembly of the torque converter 100, is positioned between the front cover 102 and the turbine assembly 106 and is configured for transferring torque from the turbine assembly 106 to a transmission input shaft (not shown). The damper assembly 108 includes two cover plates-a turbine side cover plate 136, which is fixed to the inner radial extension 128, e.g., via rivets, and a front cover side cover plate 138, which is disposed axially between the front cover 102 and the turbine side cover plate 136. The cover plates 136, 138 support a set of arc springs 140 axially therebetween.

The damper assembly 108 also includes a drive flange 142 positioned axially between the cover plates 136, 138. The drive flange 142 is configured for non-rotatably connecting to the transmission input shaft. Radially outside of the arc springs 140, the cover plates 136, 138 are fixed together by a plurality of circumferentially spaced connectors (not numbered), e.g., rivets. The connectors pass through the cover plates 136, 138 into circumferential spaces (not numbered) formed between outer tabs (not numbered) extending from a radial outer end of the drive flange 142.

The damper assembly 108 further includes an intermediate flange 144 having a body 146 disposed axially between the cover plates 136, 138, and specifically between the drive flange 142 and the front cover side cover plate 138. The intermediate flange 144 and the drive flange 142 each engage with the arc springs 140 to transmit torque through the damper assembly 108. The body 146 and the drive flange 142 each include circumferentially extending slots (not numbered) for receiving respective arc springs 140. The slots in the body 146 may, for example, be circumferentially offset relative to the slots in the drive flange 142 such that one slot of the body 146, at least partially, overlaps circumferentially adjacent slots of the drive flange 142. The intermediate flange 144 and the drive flange 142 may be configured to rotate relative to each other to transmit torque through the damper assembly 108.

The intermediate flange 144 further includes an axially extending portion 148 arranged at an inner diameter of the body 146. The axially extending portion 148 is arranged radially inside of an inner diameter of the front cover side cover plate 138. The axially extending portion 148 extends from the body 146 to an end 150. The end 150 is disposed between the front cover 102 and the body 146. The axially extending portion 148 may, for example, extend entirely circumferentially, i.e., continuously, about the central axis A. As another example, the axially extending portion 148 may extend discontinuously about the central axis A. That is, the axially extending portion 148 may include circumferentially adjacent segments with gaps therebetween.

The outer radial extension 126 of the turbine assembly 106 engages the impeller assembly 104 at the radially extending wall 118 via the friction material to transfer torque input into the front cover 102 by an engine crankshaft to the transmission input shaft. As the turbine assembly 106 is driven by the impeller assembly 104, either through contact via the friction material and the impeller shell 110 when the lockup clutch is locked or through fluid flow between blades 114, 120, the turbine assembly 106 transfers torque to the turbine side cover plate 136. The cover plates 136, 138 and the intermediate flange 144 transfer torque from the turbine assembly 106 to the drive flange 142 via the arc springs 140. The drive flange 142 in turn drives the transmission input shaft.

The damper assembly 108 may further include a pushing bias spring 152, which in this embodiment is a diaphragm spring, that is axially between the drive flange 142 and the turbine assembly 106. The pushing bias spring 152 engages the turbine side cover plate 136 and the drive flange 142. The pushing bias spring 152 is preloaded, i.e., compressed between the drive flange 142 and the turbine assembly 106, during installation and does not relax to a free state. When in drive, there is no axial force being transmitted by the pushing bias spring 152, and therefore the damper assembly 108 has no additional hysteresis, which may be beneficial for NVH (i.e., "noise," "vibration," and "harshness") performance, and the performance during a shift event can be equal to that of a baseline torque converter. Additionally, the damper assembly 108 may be arranged and configured to limit the axial force generated by the pushing bias spring 152 to prevent the piston from self-locking during the coast condition. More specifically, the maximum load produced in the coast condition may be limited by the load characteristics of the pushing bias spring 152 to prevent the lockup clutch from self-locking at high coast torques during the coast condition.

The damper assembly 108 may further include a centering plate 154, fixed to the front cover 102, e.g. via a projection weld, and a bushing 156 press-fitted into the centering plate 154. That is, the bushing 156 must be forcefully installed into the centering plate 154 such that the two are fixed together. The hub 132 may be installed into the bushing 156 and rotatable relative to the bushing 156.

The damper assembly 108 further includes a pulling bias spring 158, which in this embodiment is a diaphragm spring, that is axially between the end 150 of the axially extending portion 148 and the front cover side cover plate 138. The pulling bias spring 158 engages the front cover side cover plate 138 and the axially extending portion 148. The pulling bias spring 158 is preloaded, i.e., deflected by the front cover side cover plate 138 and the axially extending portion 148, during installation and does not relax to a free state. The pulling bias spring 158 is configured to exert a continuous axial load onto the front side cover plate 138 and the axially extending portion 148 so as to pull the intermediate flange 144 and the front side cover plate 138 together, i.e., in opposite axial directions, which creates friction and may be beneficial NVH performance.

The pulling bias spring 158 includes a body 160 contacting the front side cover plate 138, and at least one tab 162 engaged with the axially extending portion 148. The body 160 is arranged between the front cover 102 and the front side cover plate 138. Specifically, the body 160 contacts an axial side of the front cover side cover plate 138 that faces the front cover 102.

The tab(s) 162 extend radially inwards from the body 160, e.g., an inner diameter thereof, and extend axially from the body 160 towards the turbine assembly 106. The tab(s) 162 of the pulling bias spring 158 engage(s) the axially extending portion 148 axially between the body 160 and the body 146. That is, the axially extending portion 148 includes a retaining feature configured to retain the pulling bias spring 158 in an installed state. The retaining feature is disposed axially between the body 160 and the body 146 to maintain deflection of the tab(s) 162. As shown in FIGS. 1-2, the retaining feature may be at least one slot 164 configured to receive one respective tab 162. The slot(s) 164 may be disposed axially between the end 150 and the body 146. Specifically, the slot(s) 164 may be disposed between the body 146 and the axial side of the front cover side cover plate 138 that faces the front cover 102. The slot(s) 164 may extend, at least partially, radially through the axially extending portion 148. In an installed state, the tab(s) 162 are disposed in the corresponding slot(s) 164. In the installed state, the tab(s) 162 exert a force on the axially extending portion 148 in the slot(s) 164 and on the front cover side cover plate 138 so as to pull the slot(s) 164 towards the axial side of the front cover side cover plate 138 that faces the front cover 102. To preload the pulling bias spring 158 in this example, the body 160 is contacted against the front cover side cover plate 138. Then, the tab(s) 162 are pushed axially against the end 150 of the axially extending portion 148 such that the tab(s) 162 deflect radially outwardly. The pulling bias spring 158 axially slides along the axially extending portion 148 until the tab(s) 162 reach the corresponding slot(s) 164 and deflect radially inwardly to engage the respective slot(s) 164.

As another example, as shown in FIGS. 3-6, the retaining feature may be a flange 364 disposed at the end 150. In the example shown in FIG. 3, the flange 364 may extend continuously along the end 150. The flange 364 extends radially outwardly from the end 150. The flange 364 includes an axial side that faces the body 146, which is disposed axially between the body 146 and the axial side of the front cover side cover plate 138 that faces the front cover 102. In the installed state, the tab(s) 162 contact the flange 364. In this situation, the tab(s) 162 exert a force on the axial side that faces the body 146 and on the front cover side cover plate 138 so as to pull the flange 364 towards the axial side of the front cover side cover plate 138 that faces the front cover 102. To preload the pulling bias spring 158 in this example, the body 160 is contacted against the front cover side cover plate 138. Then, the tab(s) 162 are pushed axially against the flange 364 of the axially extending portion 148 such that the tab(s) 162 deflect radially outwardly. The pulling bias spring 158 axially slides along the axially extending portion until the tab(s) 162 move axially past the flange 364, which allows the tab(s) 162 to deflect radially inwardly and engage the axial side of the flange 364 facing the body 146.

Figure 5:
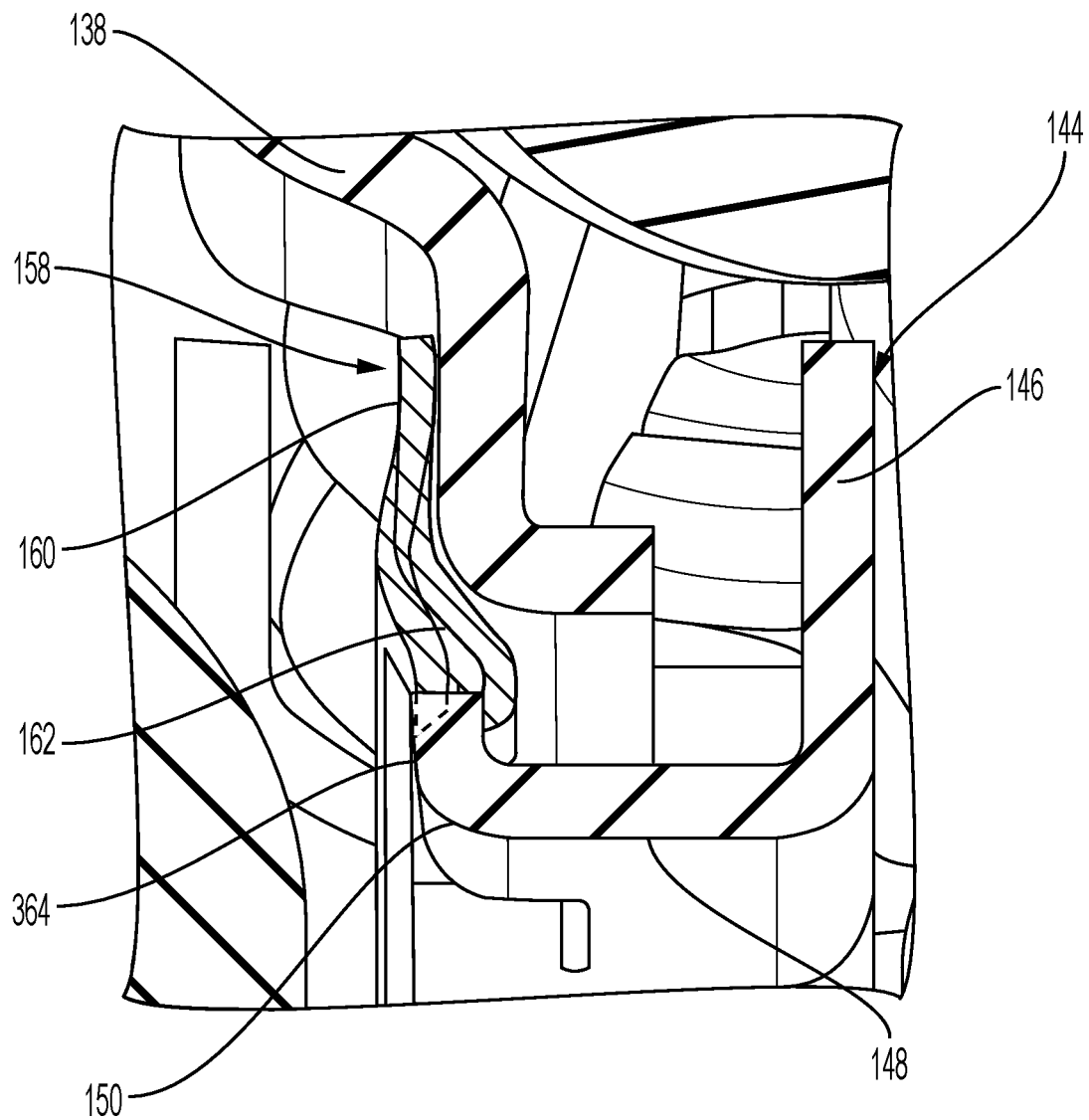
FIG. 5 illustrates an enlarged view of the area of the torque converter shown in FIG. 3 according to an alternative embodiment of the intermediate flange.
Figure 6:
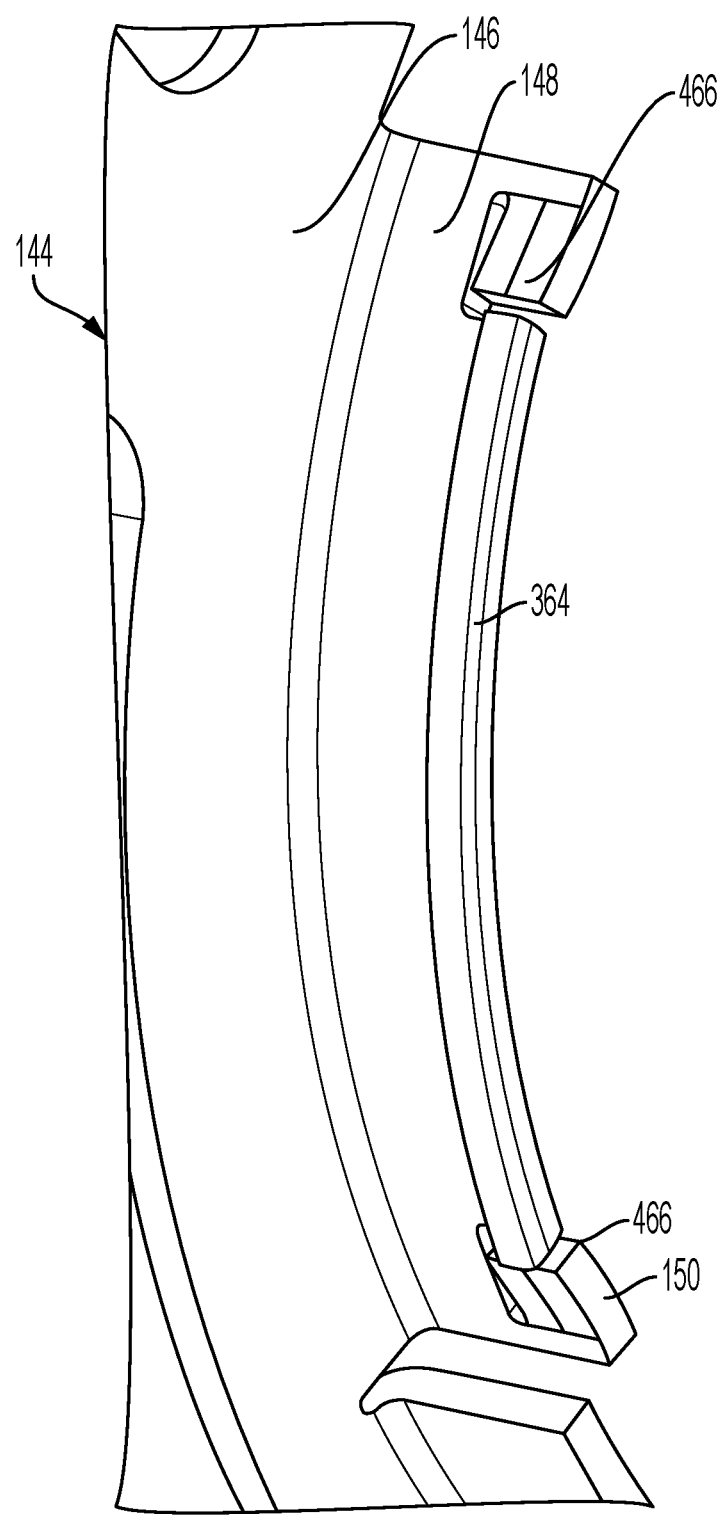
FIG. 6 illustrates a perspective view of a portion of an intermediate flange according to the embodiment shown in FIG. 5.

In the example shown in FIGS. 5-6, the flange 364 may extend partially along the end 150. In this situation, the axially extending portion 148 may further include radial stops 466 circumferentially spaced from each other. The flange 364 is disposed circumferentially between the radial stops 466. The radial stops 466 extend axially from the end 150 towards the body 146. The radial stops 466 extend radially outwardly of an outer circumference of the axially extending portion 148. The radial stops 466 are configured to radially constrain the pulling bias spring 158, i.e., limit rotation of the pulling bias spring 158 such that the tab(s) 162 remain engaged with the flange 364. To preload the pulling bias spring 158 in this example, the body 160 is contacted against the front cover side cover plate 138 with the tab(s) 162 being circumferentially offset from the flange 364. The body 160 is then rotated to align the tab(s) 162 with the flange 364. In this situation, each tab 162 engages one radial stop 466 and is deflected radially inwardly. Once the tab(s) 162 clears the respective radial stops 466 in a circumferential direction, the tab(s) 162 deflect radially inwardly and engage the axial side of the flange 364 facing the body 146. Further, the tab(s) 162 are arranged, at least partially, radially inside of the radial stops 466, which prevents further rotation of the pulling bias spring 158.

By pulling the axially extending portion 148 towards the front cover side cover plate 138, and specifically, an inner diameter thereof, the pulling bias spring 158 allows the body 146 of the intermediate flange 144 to directly contact the front cover side cover plate 138 radially outside of the arc springs 140. That is, the pulling bias spring 158 is configured to pull the front side cover plate 138 and intermediate flange 144 into contact with each other without transferring axial loads to additional components in the damper assembly 108. As such, a stack path for the pulling bias spring 158 is defined by a first axial offset between a portion of the front cover side cover plate 138 contacting the pulling bias spring 158 and a portion of the front cover side plate 138 contacting the intermediate flange 144 and a second axial offset between a portion of the intermediate flange 144 contacting the front cover side plate 138 and a portion of the intermediate flange 144 contacting the pulling bias spring 158. The stack path for the pulling bias spring 158 is thereby reduced compared to a stack path for typical pushing bias springs, which further include axial offsets resulting between contacts of additional components in the damper assembly 108.

Embodiments according to the present disclosure provide various advantages including providing a bias spring that pulls the intermediate flange and the one cover plate together, which reduces a stack path for creating friction between the intermediate flange and the one cover plate. By reducing the stack path, a variation in install height of the diaphragm spring can be reduced as compared to bias springs that push components into contact with each other, which can result in more consistent hysteresis, loads, and stresses for the bias spring while satisfying packaging constraints of the torque converter.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

LIST OF REFERENCE NUMBERS 100 torque converter
102 front cover
104 impeller assembly
106 turbine assembly
108 damper assembly
110 impeller shell
112 impeller blade
114 impeller hub
116 blade supporting portion
118 radially extending wall
120 turbine shell
122 turbine blade
124 blade supporting portion
126 outer radial extension
128 inner radial extension
130 axially extending inner circumferential section
132 hub
136 cover plate
138 cover plate
140 spring
142 drive flange
144 intermediate flange
146 body
148 axially extending portion
150 end
152 pushing bias spring
154 centering plate
156 bushing
158 pulling bias spring
160 body 162 tab
164 slot
364 flange
466 radial stops
A central axis

What is claimed is:

1. A torque converter, comprising:
a front cover arranged to receive torque;
an impeller having an impeller shell non-rotatably connected to the front cover;
a turbine in fluid communication with the impeller and including a turbine shell;
a damper assembly disposed axially between the front cover and the turbine shell, the damper assembly including:
a first cover plate non-rotatably connected to the turbine shell;
a second cover plate non-rotatably connected to the first cover plate and disposed axially between the front cover and the first cover plate;
an intermediate flange disposed axially between the first cover plate and the second cover plate; and
a bias spring engaged with the intermediate flange and the second cover plate, the bias spring being configured to pull the second cover plate into contact with the intermediate flange.

2. The torque converter of claim 1, wherein the damper assembly further includes a drive flange disposed axially between the first and second cover plates, the drive flange being arranged to non-rotatably connect to a transmission input shaft.

3. The torque converter of claim 2, wherein the intermediate flange is disposed axially between the drive flange and the second cover plate, the intermediate flange being radially spaced from the transmission input shaft.

4. The torque converter of claim 2, further comprising a further bias spring engaged with the turbine shell and the first cover plate, the further bias spring being configured to push the first cover plate into contact with the drive flange.

5. The torque converter of claim 4, wherein the further bias spring is disposed radially inside of the intermediate flange.

6. The torque converter of claim 1, wherein the damper assembly further includes an arc spring supported by the first cover plate and the second cover plate, wherein the bias spring is disposed radially inside inward of the arc spring.

7. The torque converter of claim 6, wherein the intermediate flange and the second cover plate are configured to contact each other radially outside of the arc spring.

8. The torque converter of claim 1, wherein the intermediate flange includes an axially extending portion disposed radially inside inward of the second cover plate, the bias spring being engaged with the axially extending portion.

9. The torque converter of claim 8, wherein the axially extending portion includes a slot extending, at least partially, radially therethrough, the bias spring being disposed, at least partially, in the slot.

10. The torque converter of claim 8, wherein the axially extending portion includes a flange extending radially outwardly from the axially extending portion, the bias spring being in contact with the flange.

11. The torque converter of claim 10, wherein the axially extending portion includes two radial stops circumferentially spaced from each other and configured to radially constrain the bias spring, the flange being disposed circumferentially between the two radial stops.

12. The torque converter of claim 1, wherein the bias spring includes a body in contact with the second cover plate and a tab extending radially inwardly from the body, the body being disposed axially between the second cover plate and the front cover.

13. The torque converter of claim 12, wherein the intermediate flange includes a retaining feature disposed axially between the body and the first cover plate, the retaining feature being configured to deflect the tab relative to the body towards the first cover plate.

14. A damper assembly for a torque converter, comprising:
a first cover plate arranged to receive torque;
a second cover plate non-rotatably connected to the first cover plate and axially spaced from the first cover plate;
an intermediate flange disposed axially between the first cover plate and the second cover plate; and
a bias spring engaged with the intermediate flange and the second cover plate, the bias spring being configured to pull the second cover plate into contact with the intermediate flange.

15. The damper assembly of claim 14, further comprising an arc spring supported by the first cover plate and the second cover plate, wherein the bias spring is disposed radially inward of the arc spring.

16. The damper assembly of claim 15, wherein the intermediate flange and the second cover plate are configured to contact each other radially outside of the arc spring.

17. The damper assembly of claim 14, wherein the bias spring includes a body in contact with the second cover plate and a tab extending radially inwardly from the body, the second cover plate being disposed, at least partially, between the body and the first cover plate.

18. The damper assembly of claim 17, wherein the intermediate flange includes a retaining feature disposed axially between the body and the first cover plate, the retaining feature being configured to deflect the tab relative to the body towards the first cover plate.

19. The damper assembly of claim 14, wherein the intermediate flange includes an axially extending portion disposed radially inward of the second cover plate, the bias spring being engaged with the axially extending portion.

20. The damper assembly of claim 19, wherein the axially extending portion includes a retaining feature configured to engage the bias spring, the retaining feature being one of a slot or a radially extending flange.

* * * * *